(12) United States Patent
Eisenhuth

(10) Patent No.: US 10,717,460 B2
(45) Date of Patent: Jul. 21, 2020

(54) STEERING GEAR FOR A VEHICLE

(71) Applicant: Robert Bosch Automotive Steering GmbH, Schwäbisch Gmünd (DE)

(72) Inventor: Andreas Eisenhuth, Schwäbisch Gmünd (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 254 days.

(21) Appl. No.: 15/766,626

(22) PCT Filed: Jul. 21, 2016

(86) PCT No.: PCT/EP2016/067407
§ 371 (c)(1),
(2) Date: Apr. 6, 2018

(87) PCT Pub. No.: WO2017/059976
PCT Pub. Date: Apr. 13, 2017

(65) Prior Publication Data
US 2018/0297627 A1 Oct. 18, 2018

(30) Foreign Application Priority Data
Oct. 8, 2015 (DE) .................. 10 2015 117 146

(51) Int. Cl.
*B62D 3/12* (2006.01)
*F16H 19/04* (2006.01)
*F16H 55/08* (2006.01)
*F16H 55/26* (2006.01)

(52) U.S. Cl.
CPC ............. *B62D 3/12* (2013.01); *F16H 19/04* (2013.01); *F16H 55/08* (2013.01); *F16H 55/26* (2013.01); *Y10T 74/19555* (2015.01)

(58) Field of Classification Search
CPC ........................................ B62D 7/15
See application file for complete search history.

(56) References Cited

U.S. PATENT DOCUMENTS 3,064,491 A * 11/1962 Bishop .................. F16H 55/084
74/437
3,267,763 A * 8/1966 Edward .................. F16H 19/04
74/422

(Continued)

FOREIGN PATENT DOCUMENTS

DE 1 094 609 B 12/1960
DE 43 34 491 A1 4/1995

(Continued)

OTHER PUBLICATIONS

International Search Report corresponding to PCT Application No. PCT/EP2016/067407, dated Nov. 9, 2016 (German and English language document) (7 pages).

*Primary Examiner* — Howard J Sanders
*Assistant Examiner* — Gregory T Prather
(74) *Attorney, Agent, or Firm* — Maginot, Moore & Beck LLP

(57) ABSTRACT

A steering gear for a vehicle includes a steering pinion and a master rack. A toothing of the master rack includes a constant helix angle and a toothing of the steering pinion includes a changing helix angle.

5 Claims, 3 Drawing Sheets

(56) References Cited

U.S. PATENT DOCUMENTS

| | | | | |
|---|---|---|---|---|
| RE28,740 E | * | 3/1976 | Bishop | B62D 3/12 |
| | | | | 74/422 |
| 4,133,221 A | * | 1/1979 | Clary | B21K 1/767 |
| | | | | 29/893.34 |
| 4,444,070 A | * | 4/1984 | Yanai | B62D 3/123 |
| | | | | 74/422 |
| 4,573,372 A | * | 3/1986 | Abe | B23F 15/00 |
| | | | | 74/422 |
| 6,272,409 B1 | * | 8/2001 | Elwood | B62D 7/09 |
| | | | | 180/435 |
| 6,390,230 B1 | * | 5/2002 | Shimizu | B21K 1/767 |
| | | | | 180/444 |
| 6,543,569 B1 | * | 4/2003 | Shimizu | B21K 1/767 |
| | | | | 180/444 |
| 8,708,357 B2 | * | 4/2014 | Sumihara | B62D 3/12 |
| | | | | 280/93.514 |
| 10,352,429 B2 | * | 7/2019 | Hagiwara | B21K 1/767 |
| 2002/0063012 A1 | * | 5/2002 | Katou | B62D 3/12 |
| | | | | 180/427 |
| 2002/0175019 A1 | * | 11/2002 | Cole | B62D 3/12 |
| | | | | 180/428 |
| 2004/0045387 A1 | * | 3/2004 | Keller | B62D 3/12 |
| | | | | 74/422 |
| 2015/0101436 A1 | * | 4/2015 | Washnock | B62D 3/08 |
| | | | | 74/422 |

FOREIGN PATENT DOCUMENTS

| | | |
|---|---|---|
| EP | 1 878 636 A2 | 1/2008 |
| WO | 2005/054033 A1 | 6/2005 |

* cited by examiner

STEERING GEAR FOR A VEHICLE

This application is a 35 U.S.C. § 371 National Stage Application of PCT/EP2016/067407, filed on Jul. 21, 2016, which claims the benefit of priority to Serial No. DE 10 2015 117 146.5, filed on Oct. 8, 2015 in Germany, the disclosures of which are incorporated herein by reference in their entirety.

The disclosure relates to a steering gear for a vehicle.

BACKGROUND

EP 1 878 636 A2 has described a steering gear for a vehicle, which steering gear has a transmission ratio which changes with the steering wheel rotation. The toothed steering rack of the steering gear is equipped with a helical toothing with a changing helix angle, whereas the toothing geometry of the steering pinion, which is likewise formed as a helical toothing, has a constant helix angle over the circumference.

SUMMARY

The disclosure is based on the object of making the transmission ratio in steering gears for vehicles variable using simple design measures, wherein it is the intention for the toothing of a toothed steering rack of the steering gear to be produced easily.

Said object is achieved according to the disclosure by means of the features of the independent claims. The dependent claims specify expedient refinements.

The steering gear has a variable transmission ratio profile in the case of which, for example, steer angle changes predefined by the driver by means of the steering wheel lead to smaller wheel steer angle changes at the steerable wheels around the zero position of the steering system than in the case of relatively large deflections out of the zero position.

According to one aspect of the disclosure, both the toothed steering rack and the steering pinion which meshes with the toothed steering rack, and which is coupled to the steering shaft of the steering system, have a helical toothing. The toothing of the toothed steering rack has, along its axis, a profile of pitch and flank angle that corresponds to the variable transmission ratio profile, but a constant helix angle, whereas the toothing of the steering pinion has a helix angle which changes over the circumference. By means of this combination of variable-pitch toothed steering rack with constant helix angle and steering pinion with changing helix angle, it is possible to realize the desired variable transmission ratio that changes with the steering wheel rotation. The helix angle of the steering pinion characterizes the deviation of the tooth direction—that is to say of the tooth flanks from the perpendicular to the central plane of the steering pinion, wherein the perpendicular coincides with the axis of rotation of the steering pinion. The helix angle of the toothed steering rack characterizes the deviation of the tooth direction or tooth flanks from the perpendicular to the longitudinal axis of the toothed steering rack.

The toothed steering rack with constant helix angle of the toothing can be produced easily, in particular by means of a chip-removing process in the case of which, owing to the constant helix angle, the tool travels through the toothed steering rack only in one direction. This constitutes a considerable simplification during the production of the toothed steering rack. For example, the toothing on the toothed steering rack may be produced by means of broaching.

The toothing production methods of gear shaping and hob peeling are basically suitable for the production of a helical toothing with a changing helix angle using only one tool.

In one advantageous embodiment, the toothing of the steering pinion has at least two helix angle sections with different helix angles. The helix angle is advantageously constant within each helix angle section. The transition between the helix angle sections is realized preferably in continuous form and without step changes, such that, between the helix angle sections, there are transition sections whose teeth have helix angles which lie between the helix angle of the first section and the helix angle of the second section. It is also possible for said transition region to have, in an axial direction, a helix angle change within one tooth, such that said tooth then has a curved shape. The helix angles in the helix angle sections may differ by a minimum value, which is for example 5°. It is furthermore expedient for the helix angle difference between the helix angle sections to not exceed a maximum value, which is for example 45°.

In a further expedient embodiment, the steering pinion is mounted in a gear housing of the steering gear and can rotate exclusively about its axis of rotation. Furthermore, there are no adjustment possibilities with regard to the steering pinion.

According to a further aspect of the disclosure, which likewise relates to a steering gear for a vehicle having a transmission ratio which changes with the steering wheel rotation, it is likewise the case that the toothings of the toothed steering rack and of the steering pinion each have a helical toothing with a helix angle, wherein, in a preferred embodiment, the toothings both of the steering pinion and of the toothed steering rack are provided with a constant helix angle. The changing transmission ratio is made possible by virtue of the steering pinion being mounted in the gear housing such that, in addition to its rotation capability, it is pivotable about a pivot axis which is at an angle with respect to the axis of rotation of the steering pinion. It is thus duly possible, but not necessary, for a toothing with a changing helix angle to be provided on the steering pinion or on the toothed steering rack. The changing transmission ratio is made possible by means of the pivotability of the steering pinion.

The pivot axis is preferably orthogonal to the axis of rotation of the steering pinion, wherein pivot axes are also possible which are at an angle of greater than 0° and less than 90° with respect to the axis of rotation. It is advantageous for the pivoting movement of the steering pinion about the pivot axis to be performed as a function of the rotational movement of the steering pinion about its axis of rotation. Here, consideration is given in particular to a kinematic, positively guided pivoting movement as a function of the rotational movement of the steering pinion about its axis of rotation, such that it is ensured that every angle of rotation of the steering pinion is assigned exactly one housing angle of the steering pinion.

The steering pinion may possibly have one or more helix angle sections in which the helix angle is equal to zero, such that the tooth flanks of the teeth run parallel to the axis of rotation. However, in any case, the steering pinion has at least one helix angle section in which the teeth have a non-zero helix angle.

BRIEF DESCRIPTION OF THE DRAWINGS

Further advantages and expedient embodiments emerge from the further claims, from the figure description and from the drawings, in which:

DETAILED DESCRIPTION

In the figures, identical components are denoted by the same reference designations.

Figure 1:
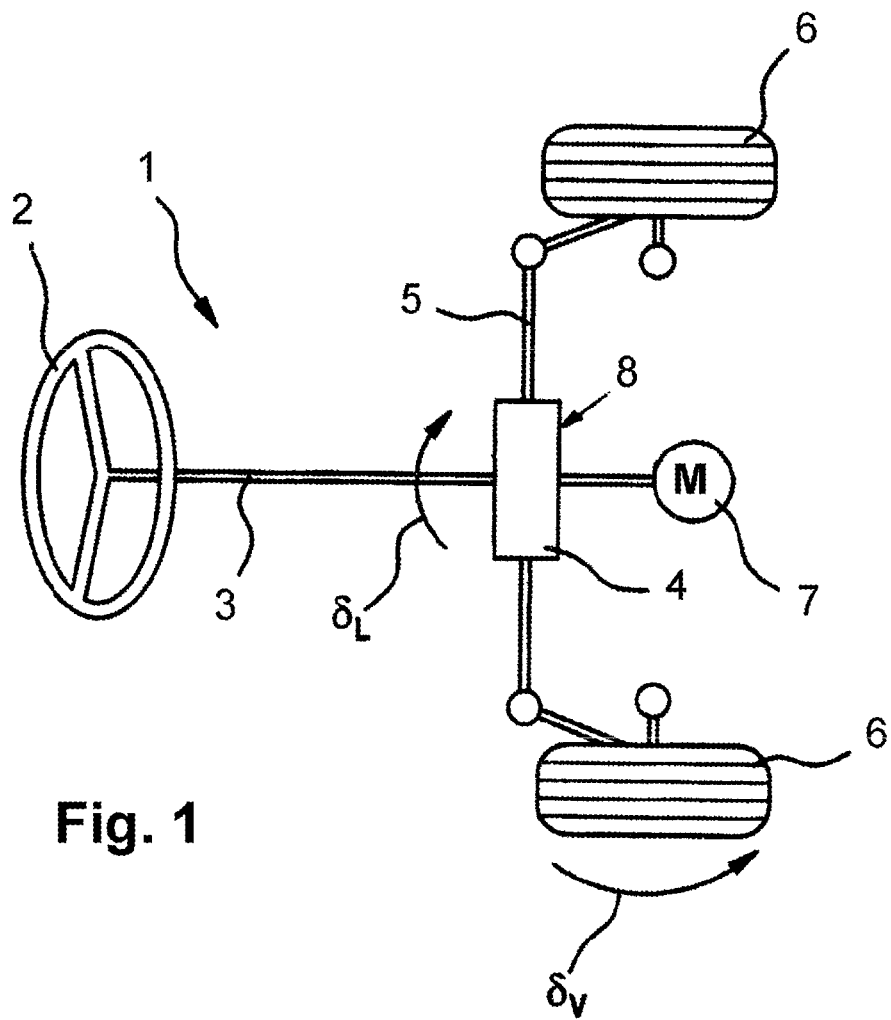
FIG. 1 shows a schematic illustration of a steering system in a vehicle.

The steering system 1 illustrated in FIG. 1 for a vehicle comprises a steering wheel 2, a steering spindle or shaft 3, a steering or gear housing 4, and a steering linkage with a toothed steering rack 5, via which a steering movement is transmitted to the steerable wheels 6 of the vehicle. The gear housing 4 accommodates a steering gear 8 with a steering pinion and the toothed steering rack 5, wherein the steering pinion is connected rotationally conjointly to the steering shaft 3 and meshes with the toothed steering rack 5.

By means of the steering wheel 2, to which the steering shaft 3 is fixedly connected, the driver predefines a steer angle $\delta_L$ which, in the steering gear 8 in the gear housing 4, is transmitted to the toothed steering rack 5 of the steering linkage, whereupon a wheel steer angle $\delta_V$ is set at the steerable wheels 6.

To assist the manual torque imparted by the driver, an electric servo motor 7 is provided, by means of which a servo torque can be fed into the steering gear 8. Instead of an electric servo motor, it is also possible for a hydraulic assistance device to be provided, for example a hydraulic pump, which is driven by an internal combustion engine and which feeds a hydraulic steering system.

Figure 2:
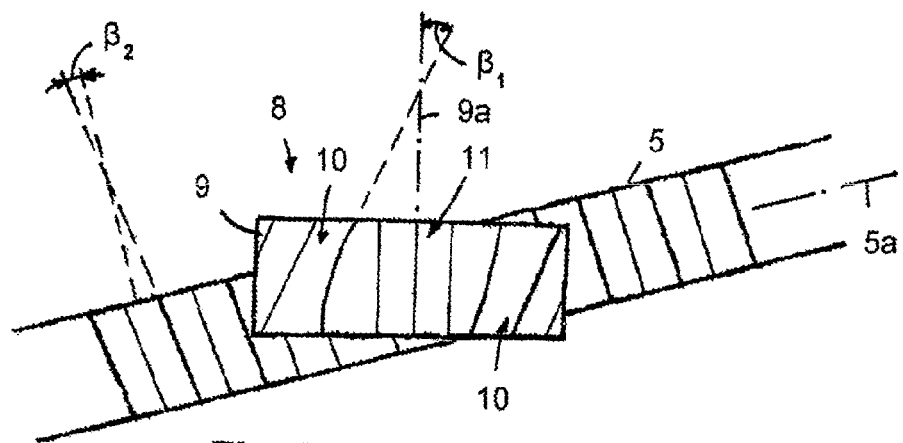
FIG. 2 shows a schematic illustration in a plan view of a steering gear with steering pinion and toothed steering rack, wherein the steering pinion has a toothing with different helix angles.

FIG. 2 illustrates the steering gear 8 with the toothed steering rack 5 and the steering pinion 9 engaging therein. The toothed steering rack 5 has a toothing with a constant helix angle of greater than 0°, such that the tooth flanks of the teeth assume an angle of greater than 0° with respect to an orthogonal to the longitudinal axis 5a of the toothed steering rack 5. The toothing of the toothed steering rack 5 has a constant helix angle $\beta_2$.

The steering pinion 9 has different helix angle sections 10 and 11, wherein the helix angle is constant within each helix angle section 10, 11, but the helix angles differ between the helix angle sections. The illustration shows the helix angle $\beta_1$ for the helix angle section 10, wherein the helix angle $\beta_1$ is defined in relation to the axis of rotation 9a about which the steering pinion 9 can rotate. The helix angle of the toothing in the further helix angle section 11 is significantly smaller than the helix angle $\beta_1$ of the helix angle sections 10 adjoining said further helix angle section on both sides, and may possibly be 0°. The helix angle section 11 is situated in the zero or initial or rest position of the steering system, which is adjoined on both sides by the helix angle sections 10 with the greater helix angle $\beta_1$.

The transition between the helix angle sections 10, 11 is realized in continuous form and without step changes. Accordingly, between the first helix angle section 10 with the helix angle $\beta_1$ and the second helix angle section 11 with a different helix angle, there is a transition region in which the helix angle changes even within one tooth.

The helix angles $\beta_1$ in the helix angle section 10 of the steering pinion 9 and $\beta_2$ of the toothed steering rack 5 may be equal or may possibly differ from one another.

The toothed steering rack 5 and steering pinion 9 are at an angle with respect to one another, such that the longitudinal axis 5a of the toothed steering rack 5 and the axis of rotation 9a of the steering pinion 9 assume a non-90° angle with respect to one another. The angle lies for example in an angle range between 60° and less than 90°.

Owing to the changing helix angle in the toothing of the steering pinion 9, a variable steering transmission ratio as the steering pinion 9 rolls on the toothing of the toothed steering rack 5 is realized with a corresponding variability of pitch and flank angle.

Figure 3:
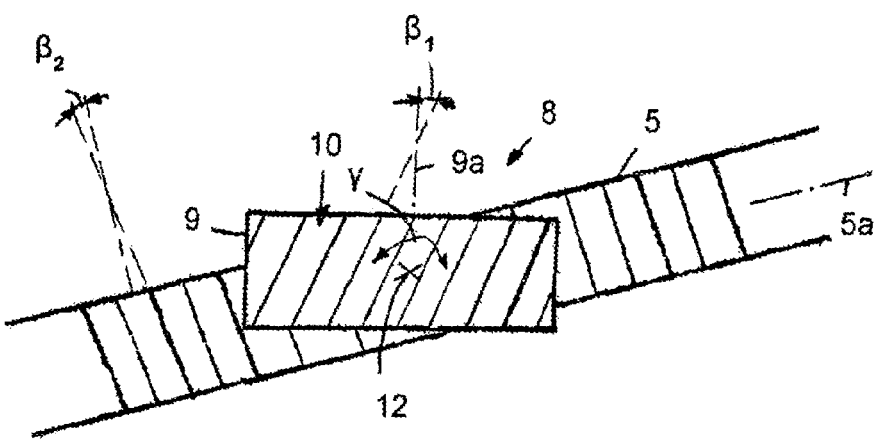
FIG. 3 shows a further exemplary embodiment of a steering gear with steering pinion and toothed steering rack in plan view, wherein steering pinion and toothed steering rack each have a constant helix angle, but the steering pinion is mounted so as to be pivotable.
Figure 4:
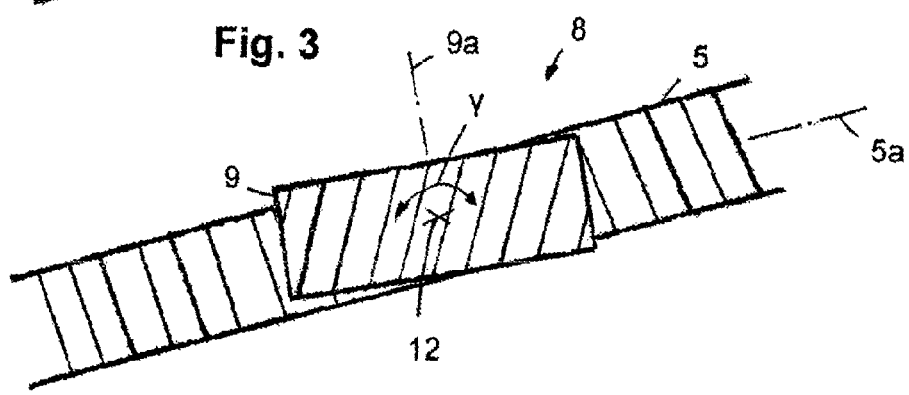
FIG. 4 shows the steering gear with steering pinion and toothed steering rack as per FIG. 3 with the steering pinion in a pivoted state.

FIGS. 3 and 4 illustrate a further exemplary embodiment of a steering gear 8 with a toothed steering rack 5 and with a steering pinion 9. The toothed steering rack 5 has a helical toothing with variable pitch and flank angle, but a helix angle $\beta_2$ of greater than 0°. The steering pinion 9 has only a single helix angle section 10 with a uniform helix angle $\beta_1$, which is greater than 0°. In order to kinematically exactly correspond to the variable transmission ratio, the steering pinion 9 is mounted in the steering housing or gear housing such that, in addition to its rotation capability about the axis of rotation 9a, it is pivotable about a pivot axis 12. The pivot axis 12 lies in a central plane of the steering pinion 9 and is orthogonal to the axis of rotation 9a. Pivot axes are however also possible which are at a non-90° angle with respect to the axis of rotation.

Furthermore, pivot axes are also possible which lie in a plane which is orthogonally offset and parallel with respect to the central plane.

As can be seen from a comparison of FIGS. 3 and 4, the housing angle $\gamma$ at which the steering pinion 9 is positioned relative to the gear housing changes as the steering pinion 9 rolls on the toothed steering rack 5. The pivoting of the steering pinion 9 about the pivot axis 12, and the associated change of the housing angle $\gamma$, takes place with kinematically positive guidance in a manner dependent on the rotational movement of the steering pinion 9 about the axis of rotation 9a. It is hereby ensured that every angle of rotation of the steering pinion 9 about the axis of rotation 9a is assigned exactly one housing angle $\gamma$.

Figure 5:
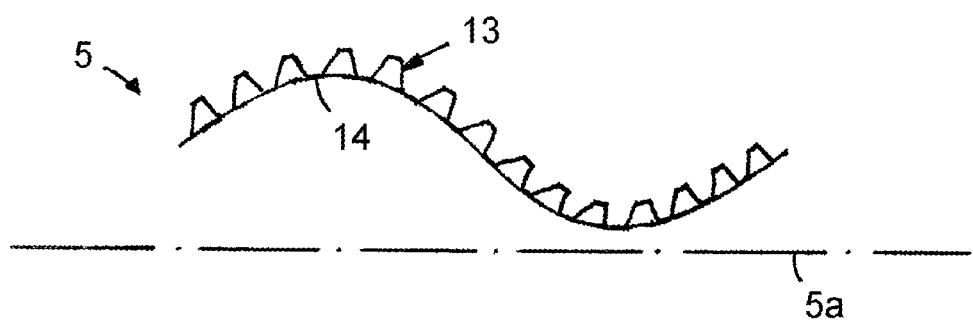
FIG. 5 shows a view of a toothed steering rack whose side on which the toothing is situated is of curved form.

FIG. 5 illustrates a further design variant in which the toothing 13 of the toothed steering rack 5 lies not in a plane but on a curved line 14, whereby it is likewise possible for the transmission ratio to be influenced as the steering pinion rolls on the toothed steering rack. As an alternative to the curved line, the toothing 13 may also be arranged in a plane on the toothed steering rack 5.

LIST OF REFERENCE DESIGNATIONS

1 Steering system
2 Steering wheel
3 Steering shaft
4 Gear housing
5 Toothed steering rack
5a Longitudinal axis
6 Front wheel
7 Electric servo motor
8 Steering gear
9 Steering pinion 9a Axis of rotation
10 Helix angle section
11 Helix angle section
12 Pivot axis
13 Toothing
14 Curved line

The invention claimed is:

1. A steering gear assembly for a vehicle, comprising:
a toothed steering rack; and
a steering pinion configured to mesh with the toothed steering rack,
wherein a transmission ratio of the toothed steering rack and the steering pinion is configured to change with a rotation of a steering wheel of the vehicle,
wherein a rack toothing of the toothed steering rack has a constant helix angle, and
wherein a pinion toothing of the steering pinion has a helix angle that changes over a circumference of the steering pinion.

2. The steering gear assembly as claimed in claim 1, wherein:
the pinion toothing includes at least two helix angle sections having different helix angles; and
the helix angle of each of the at least two helix angle sections is constant.

3. The steering gear assembly as claimed in claim 2, wherein the helix angles of the at least two helix angle sections differ by at least 10°.

4. The steering gear assembly as claimed in claim 2, wherein the helix angles of the at least two helix angle sections differ by at most 45°.

5. The steering gear assembly as claimed in claim 1, wherein:
the steering pinion defines an axis of rotation; and
the steering pinion is mounted in a gear housing exclusively about the axis of rotation.

* * * * *